United States Patent
Itoh (10) Patent No.: US 7,164,889 B2
(45) Date of Patent: Jan. 16, 2007

(54) MOBILE COMMUNICATION SYSTEM (75) Inventor: Katsutoshi Itoh, Tokyo (JP)

(73) Assignee: Sony Corporation (JP)

( * ) Notice: Subject to any disclaimer, the term of this patent is extended or adjusted under 35 U.S.C. 154(b) by 396 days.

(21) Appl. No.: 10/182,293

(22) PCT Filed: Dec. 5, 2001

(86) PCT No.: PCT/JP01/10647

§ 371 (c)(1),
(2), (4) Date: Oct. 7, 2002

(87) PCT Pub. No.: WO02/47291

PCT Pub. Date: Jun. 13, 2002

(65) Prior Publication Data

US 2003/0114114 A1 Jun. 19, 2003

(30) Foreign Application Priority Data

Dec. 5, 2000 (JP) .............................. 2000-370449

(51) Int. Cl.
*H04B 1/00* (2006.01)
*H04B 7/00* (2006.01)
*H04B 15/00* (2006.01)

(52) U.S. Cl. ........................ 455/69; 455/522; 455/503; 455/442; 455/101; 455/444

(58) Field of Classification Search ................. 455/522, 455/69, 442, 443, 444, 101, 103, 105, 502, 455/503

See application file for complete search history.

(56) References Cited

U.S. PATENT DOCUMENTS

| | | | | |
|---|---|---|---|---|
| 5,109,390 A | * | 4/1992 | Gilhousen et al. | 455/506 |
| 5,828,659 A | * | 10/1998 | Teder et al. | 455/67.16 |
| 5,883,888 A | * | 3/1999 | St-Pierre | 370/331 |
| 6,307,849 B1 | * | 10/2001 | Tiedemann, Jr. | 455/522 |
| 6,449,290 B1 | * | 9/2002 | Willars et al. | 455/13.2 |
| 6,526,028 B1 | * | 2/2003 | Kondo | 455/442 |
| 6,539,226 B1 | * | 3/2003 | Furukawa et al. | 455/522 |
| 6,724,739 B1 | * | 4/2004 | Tiedemann et al. | 370/331 |

* cited by examiner

*Primary Examiner*—Quochien B. Vuong
*Assistant Examiner*—Wen Huang
(74) *Attorney, Agent, or Firm*—Lerner, David, Littenberg, Krumholz & Mentlik, LLP (57) ABSTRACT

A communication system to which can be applied a site diversity procedure in which different transmitting stations are not synchronized with one another, and signals from plural transmitting stations are received simultaneously. The timing shift produced when signals from plural transmitting stations are received simultaneously is received by a receiving side (S101). When the timing shift has exceeded an allowable range, the communication with the transmitting station is transiently halted (S102 to S106) and, after adjusting the timing on the transmitting side, communication is re-started (S107 to S112) so that the signal reception timings from different base stations will be within an allowable range at all times.

6 Claims, 8 Drawing Sheets

MOBILE COMMUNICATION SYSTEM

TECHNICAL FIELD

This invention relates to a mobile communication system to which may be applied site diversity in which plural transmitting stations are not synchronized and in which signals from plural transmitting stations are received simultaneously.

BACKGROUND ART

Among wireless accessing systems, used in radio communication systems, such as portable telephone system, there is a CDMA (Code Division Multiple Access) system.

In the CDMA cellular communication system, it is attempted to increase the channel capacity by splitting an area or cell covered by a radio base station into plural sub-areas or sectors and by changing e.g., the code phase from one sector to another. For constituting a sector, the routine practice is to use plural directive antennas, the cells of each base station are classified depending on the orientation as seen from the base station and are associated with respective sectors, by way of a directivity antenna sector configuration. The antenna directivity and the antenna mounting direction are determined so that the respective sectors will be overlapped to a certain extent. For a mobile station lying in this overlapped area, overlapping sectors are determined. The transmission signals from a mobile station lying in the overlapping areas are despread demodulated in both overlapping sectors and synthesized with weights to demodulate data. Thus, for a mobile station moving during communication across different sectors, momentary interruption caused on sector switching maybe eliminated by soft handoff.

The CDMA system is scheduled to be applied to an IMT-2000 (International Mobile Telecommunication 2000) W-CDMA (Wideband-Code Division Multiple Access) mobile communication system, for which standardization is now going on in ITU (International Telecommunication Union) as the next-generation system.

In the W-CDMA system, the base station transmits the information with the necessary minimum power to a terminal in order to suppress interference to other cells. For realizing this, the terminal side perpetually monitors the quality of the signal received. If the signal quality is lower than the required quality, the base station is commanded to increase the transmission power. If conversely the signal quality is higher than the required quality, the base station is commanded to decrease the transmission power, by way of transmission power control (TPC).

The base station in the W-CDMA system sends information data, time-multiplexed with a known pilot symbol on the reception side, as transmission data.

The mobile terminal extracts the pilot symbol from the received signal and estimates a signal component S and an interference component I from the pilot symbol to calculate an SIR. If the calculated SIR is larger than or smaller than a threshold value, the mobile terminal sets 0 or 1 as TPC data, respectively, and transmits this TPC data as it is time-multiplexed with the information data to the base station.

The base station extracts the TPC data from the received signal and, based on this TPC data, updates the gain of an amplifier for transmission every TPC data. Specifically, the base station raises or lowers the gain by 1 dB if the TPC data is 1 or 0, respectively.

In this manner, the mobile terminal adjusts the transmission power of the base station to a minimum level, with which the reception quality as required is assured, responsive to characteristics of the radio propagation path, which are changing with lapse of time. What is crucial in this case is that a command for raising or lowering the transmission power to the base station, as determined on the side mobile terminal, is transmitted to the base station as quickly as possible and that the TPC bit command from the mobile base station will be reflected on the power on the side base station as quickly as possible.

Figure 1:
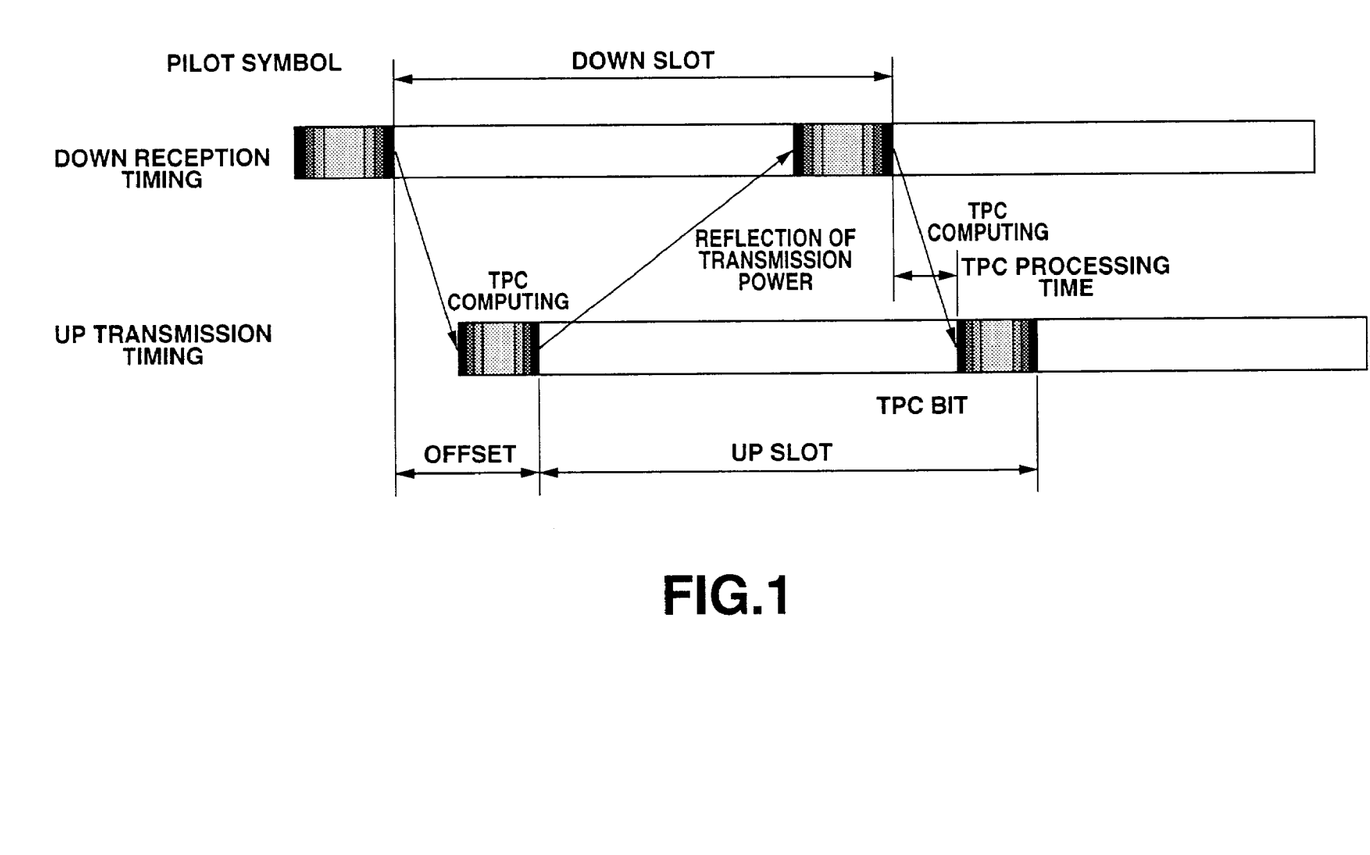
FIG. 1 shows an offset between a pilot symbol transmitted by the base station in the W-CDMA system and a TPC bit sent by a terminal.

Meanwhile, in the W-CDMA system, the pilot symbol transmitted by the base station and the TPC bit transmitted by the terminal are afforded with offset, as shown in FIG. 1. This suppresses the delay as from the monitoring of the reception quality to the TPC transmission and to the control of the base station transmission power to one slot. By shortening processing time for the above processing, it is possible to set the base station transmission power responsive to propagation characteristics (reception quality) at the current time point.

Among the techniques of improving the quality of received signals, there is site diversity of simultaneously receiving signals from plural base stations and summing the signals from the respective base stations for demodulation (synthesis). In the radio communication system, employing the CDMA system, this site diversity can be applied readily, and is also used in the W-CDMA system.

Figure 2:
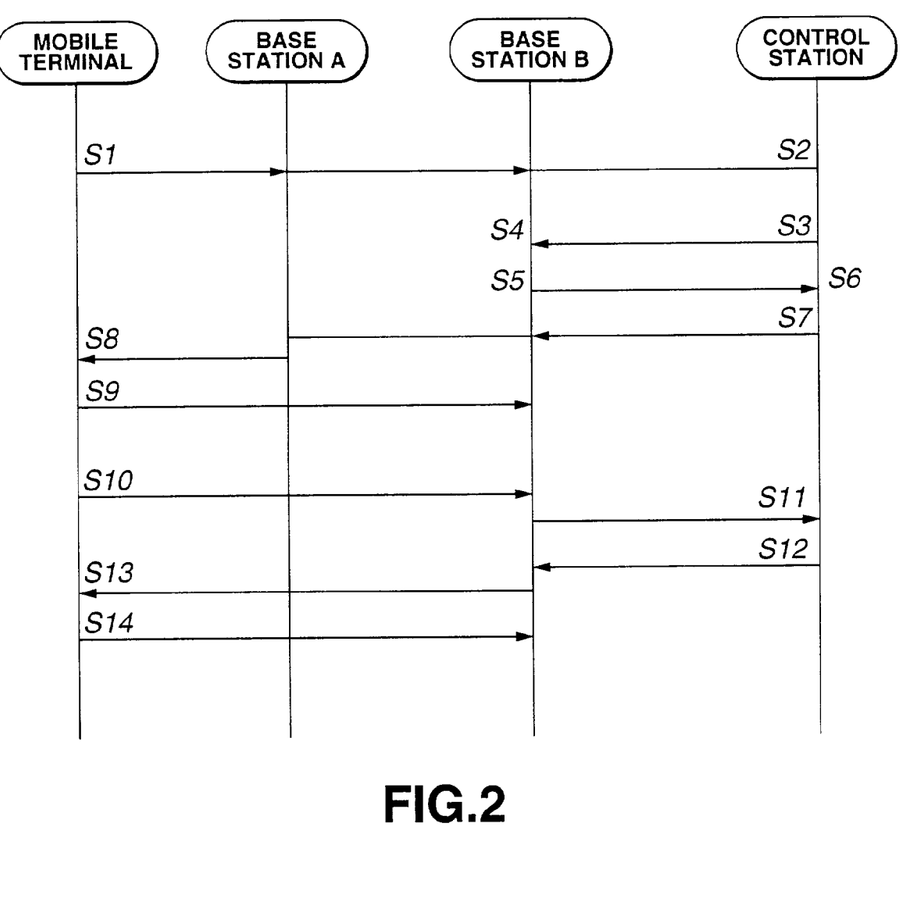
FIG. 2 shows the basic processing sequence of site diversity.

A mobile terminal 303 in the W-CDMA system employing the site diversity simultaneously receives signals from a first base station 301 and a second base station 302, controlled by a control station 300, and performs site diversity processing in accordance with a basic sequence shown in FIG. 2.

That is, the mobile terminal measures the signal strength of the neighboring base station during the time the terminal is communicating with the first base station A. At step S1, the mobile terminal detects that the strength of the received signal is increased, and sends a "measurement report message".

In the "measurement report message", there are contained an ID and reception signal strength of the first base station 301, the mobile terminal is now communicating with, an ID and the reception signal strength of the newly detected second base station B and the information on the relative reception timing of the first base station A.

At step S2, the control station detects the "measurement report message" to detect that the second base station B has newly been added.

At step S3, the control station commands the second base station B to adjust the transmission timing and to start transmission to the mobile terminal.

At step S4, the second base station B sets the transmission timing to a timing as close to the commanded timing as possible, in accordance with a command from the control station, to re-initiate transmission to the mobile terminal. At step S5, the second base station B sends a post-adjustment transmission timing report to the control station.

Using the transmission timing information of the second base station B, detected at step S6, the control station sends an "Active Set Update" message at step S7 to the mobile terminal. In the "Active Set Update" message, there are contained the IDs and the timing information of the first and second base stations A, B, so that the mobile station is commanded to receive the base station contained in this message.

On detection of the "Active Set Update" message at step S8, the mobile terminal commences to receive the second base station B and returns an "ACK" at step S9 to indicate that the processing has been finished as regularly.

The mobile terminal measures the signal strength from the base stations A, B at all times. The mobile terminal at step S10 detects that the reception signal of the first base station A has become weaker than a receivable signal level and sends a "measurement report message".

In the "measurement report message", there are contained the IDs, reception levels and the timing information of the first and second base stations A, B, indicating the low signal reception level values of the first base station A.

If the control station at step S11 detects the "measurement report message" to recognize that the reception level of the first base station A is low, the control station at step S12 sends an "Active Set Update" message. In the "Active Set Update" message, sent at this time, there is contained only the ID of the second base station B.

If the mobile terminal at step S13 receives the "Active Set Update" message, it recognizes only the ID of the second base station B in the message, and accordingly stops receiving the signals from the first base station A. Simultaneously, the mobile terminal at step S14 returns an "ACK" indicating that the processing has been finished as regularly.

On reception of the "ACK", the first base station stops transmission to the mobile terminal.

The number of the base stations with which the receiving station communicates is updated in this manner at all times.

Figure 3:
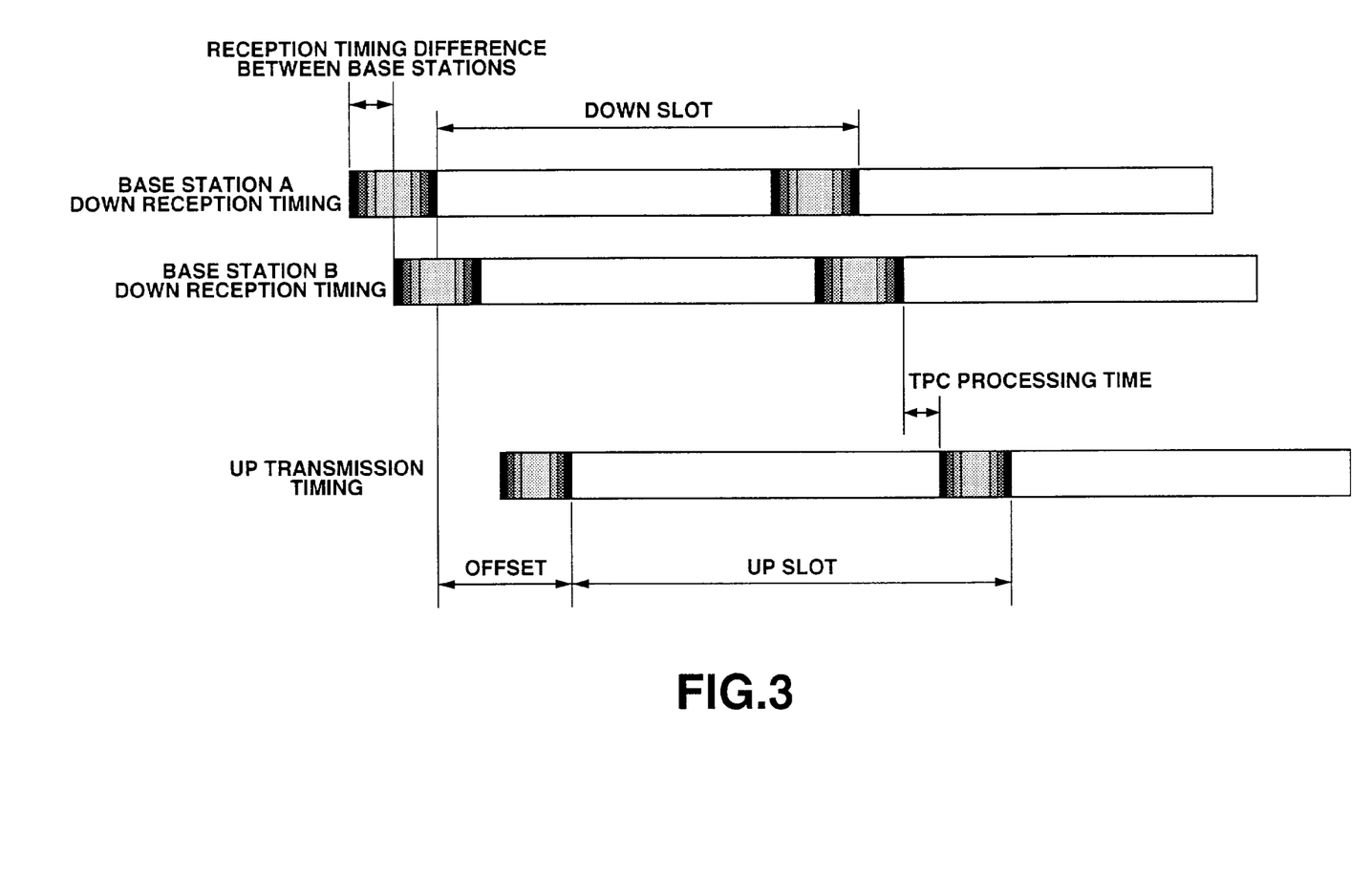
FIG. 3 schematically shows reception and transmission timings in site diversity.

FIG. 3 shows the reception timing and the transmission timing at the time of site diversity. In this site diversity, there are occasions where the timings of signals received from the respective base stations are not coincident because of different distance from the base station and non-synchroneity between the different base stations. Thus, the mobile station has to synthesize signals received at different timings, such that the mobile station first awaits reception of signals from the base station with the latest reception timing, usually the signal from the base station remotest from the mobile station, before proceeding to synthesize the signals from the respective base stations.

On the other hand, the transmission timing of the mobile terminal is defined by the offset from the signal from the base station with the earliest reception timing, such that the mobile terminal is required to keep this transmission timing rigorously.

Figure 4:
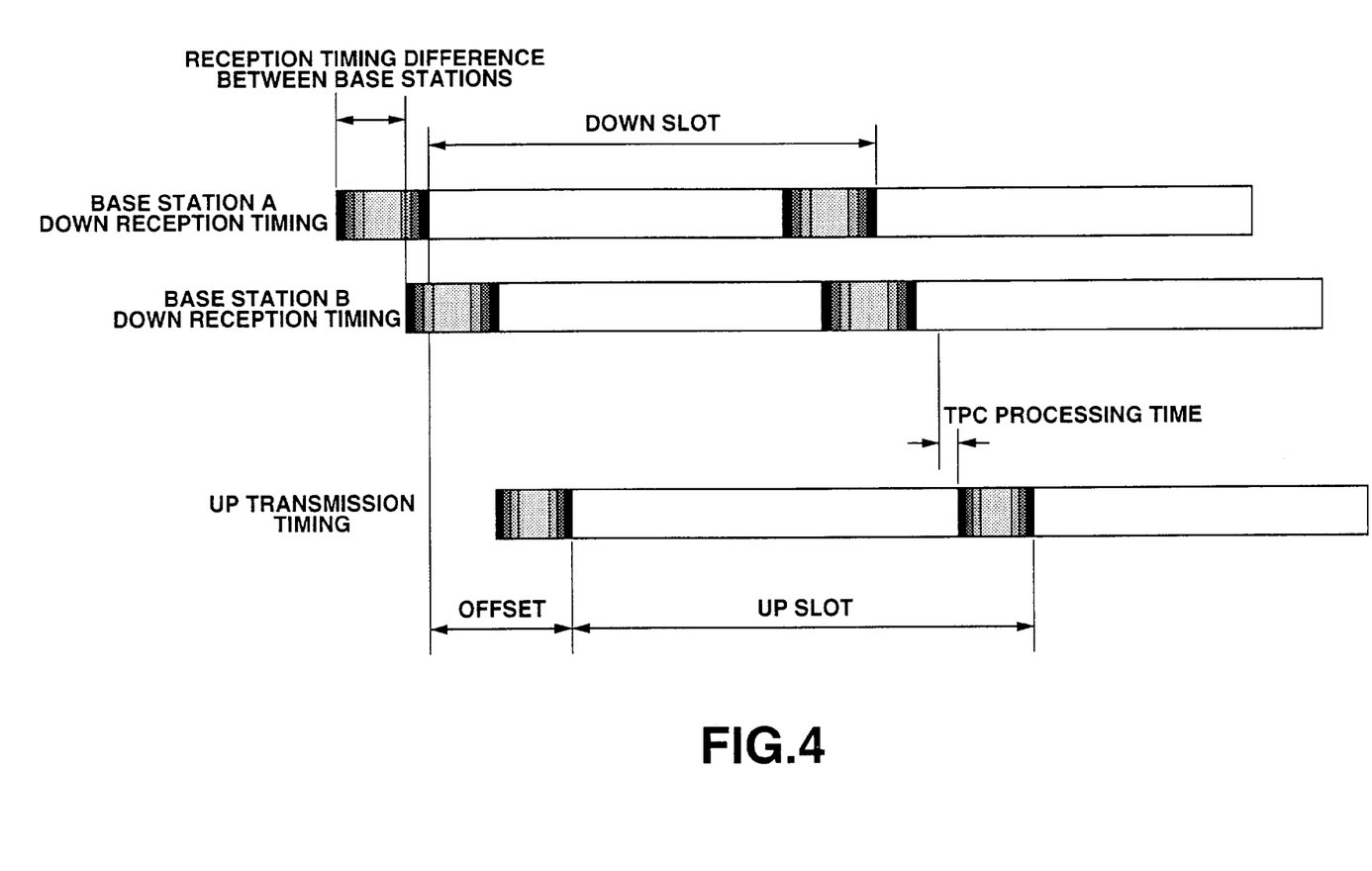
FIG. 4 schematically shows the state in which the transmission of the TCP bit may not be made in time in site diversity.

Thus, if the reception timing difference among the base stations is increased due to clock frequency shift among the base stations or due to movement of the mobile terminal, the time until fulfilment of synthesis is considerable, as shown in FIG. 4, with the result that the transmission of the TPC bits is not made in time.

There is also raised a problem that, since the transmission of the TCP bit is not made in time, the TPC information as sent ceases to be accurate, with the result that the base station cannot keep optimum transmission power.

There is also presented a problem that, if the TCP bit is determined using only a pilot symbol of the base station A of FIG. 3, the transmission power which is more than is necessary may be demanded of the base station because the signal strength of the base station B is not taken into account in signal summation.

DISCLOSURE OF THE INVENTION

It is therefore an object of the present invention to have the signal reception timings from different base stations comprised within a tolerable range at all times.

It is another object of the present invention to make effective utilization of site diversity to improve the quality of reception signals.

It is yet another object of the present invention to overcome the above-mentioned problems by solely the processing at a terminal without changing system specifications.

The present invention provides a mobile communication system exploiting the site diversity in which signals transmitted asynchronously from a plurality of base stations controlled by a control station are received simultaneously by a mobile terminal, wherein the base station includes transmission means for transmitting, slot by slot, transmission data comprised of information data and a pilot signal time-multiplexed with respect to the information data, and controlling means for controlling the transmission power of the transmission means based on the reception quality information sent from the mobile terminal. The mobile terminal generates the reception quality information based solely on the first pilot signal received to communicate the so generated information to the base station and to the control station.

The present invention also provides a mobile communication system exploiting the site diversity in which signals transmitted asynchronously from a plurality of base stations controlled by a control station are received simultaneously by a mobile terminal, wherein the base station includes transmission means for transmitting, slot by slot, transmission data comprised of information data and a pilot signal time-multiplexed with respect to the information data, and controlling means for controlling the transmission power of the transmission means based on the reception quality information sent from the mobile terminal. The mobile terminal includes reception quality information transmission means for transmitting, at the next slot, the reception signal intensity information, calculated on synthesizing signals received from the plural base stations.

The present invention also provides a mobile communication system exploiting the site diversity in which signals transmitted asynchronously from a plurality of base stations, which are controlled by a control station and which transmit, slot by slot, information data and a pilot signal time-multiplexed with respect to the information data, are received simultaneously by a mobile terminal, wherein the mobile terminal includes unusual timing information transmission means for measuring the time difference between the transmission timing and an oncoming signal from each base station, and for notifying, when the time difference has exceeded an allowable range, the information specifying the base station, for which the time difference has exceeded the allowable range, to the base station and to the control station along with the time difference as unusual timing information. The control station includes controlling means for transmitting the setting information to the mobile terminal through each base station and for controlling each base station to control site diversity. The control station sends the setting information, in which the base station the mobile terminal has become unable to receive is not included, based on the unusual timing information, to the mobile terminal through the base station the mobile terminal is able to receive.

The present invention also provides a mobile communication system exploiting the site diversity in which signals transmitted asynchronously from a plurality of base stations, which are controlled by a control station and which transmit, slot by slot, information data and a pilot signal time-multiplexed with respect to the information data, are received simultaneously by a mobile terminal. The mobile terminal includes transmission means for measuring the time difference between the transmission timing and the oncoming signal from each base station and for transmitting the measurement report information, including each reception signal level and the timing information, along with the information specifying each base station receiving the signals, to the base station and to the control station, and communication control means for performing communication control corresponding to the setting information sent from the control station through the base station. The control station includes controlling means for sending the setting information through each base station to the mobile terminal based on the measurement report information and for controlling each base station for controlling the site diversity. The mobile terminal determines that the base station for which the time difference between the transmission timing and the oncoming signal has exceeded the allowable range is unreceivable, and notifies to the control station, by the measurement report information, that the base station for which the time difference has exceeded the allowable range is to be removed from the setting information. The control station sends the setting information, from which the base station that cannot be received by the mobile terminal has been removed, to the mobile terminal through the base station receivable by the mobile terminal, based on the measurement report information.

BEST MODE FOR CARRYING OUT THE INVENTION

Referring to the drawings, an embodiment of the present invention is now explained in detail.

Figure 5:
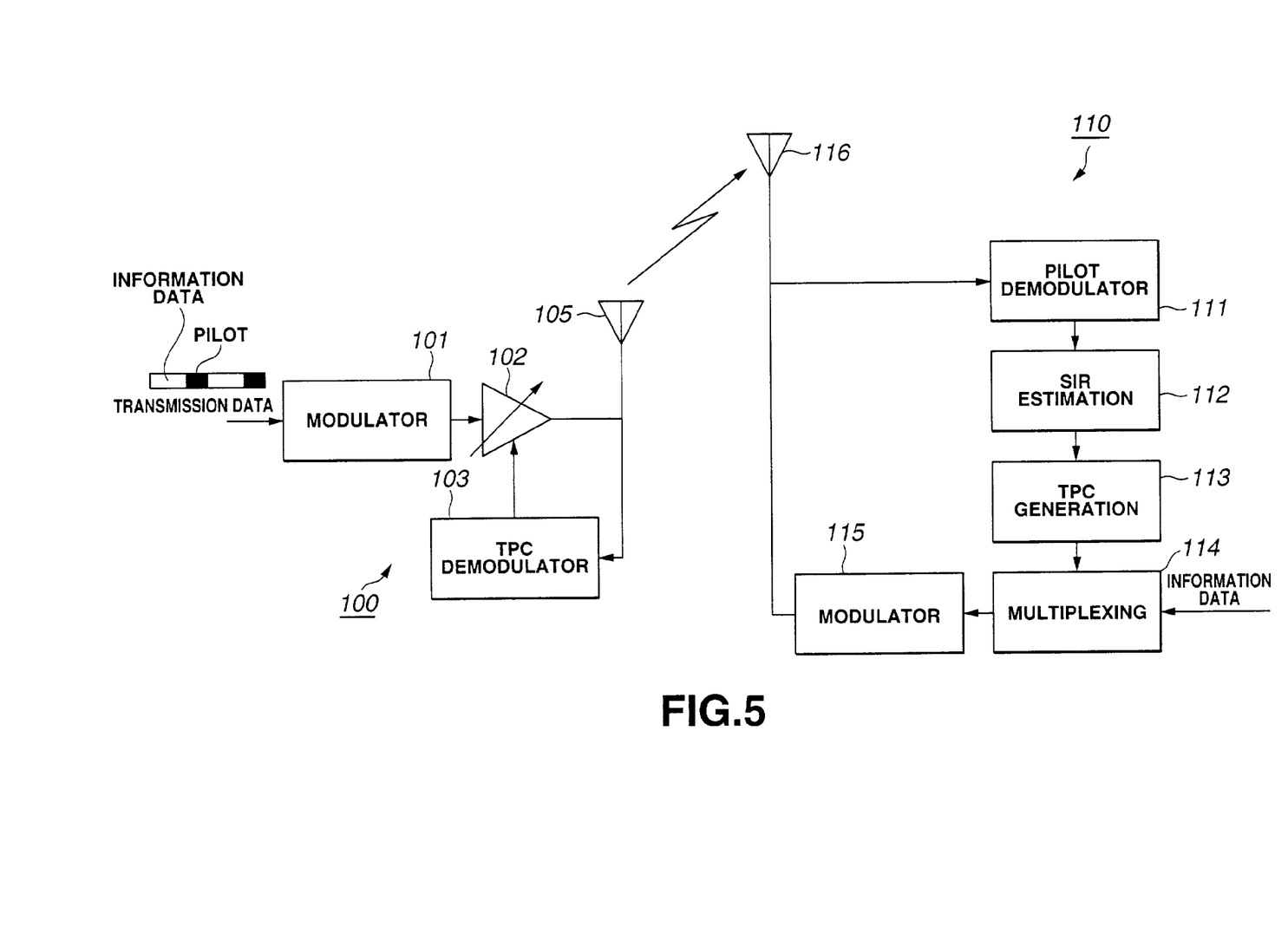
FIG. 5 is a schematic block diagram showing the structure of a mobile communication system embodying the present invention.

The present invention is applied to a mobile transmission system configured as shown for example in FIG. 5. This mobile communication system is the W-CDMA (Wideband-Code Division Multiple Access) mobile communication system to which may be applied site diversity in which transmission between different base station is asynchronous and in which signals from plural transmitting stations are received simultaneously. The mobile transmission system is made up by a base station 100 and a mobile terminal 110.

The base station 100 includes a modulation unit 101 for code-spreading transmission data, an amplifier 102 for radio transmission of transmission data code-spread by this modulation unit 101 via an antenna 105, and a TPC demodulator 103 for extracting TPC data from the signals received over the antenna 105.

Figure 6:
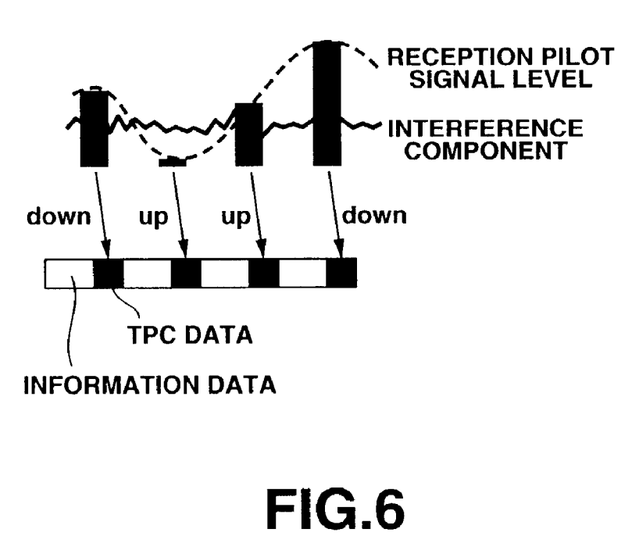
FIG. 6 schematically shows transmission data sent from the base station in the mobile transmission system.

Referring to FIG. 6, the base station 100 encoding-spreads information data and time-multiplexed with a pilot symbol known on the reception side, as transmission data by the modulation unit 101 for transmission via an amplifier 102 to a radio propagation path over antenna 105. The reception side of the base station 100 extracts the TPC data at the TPC demodulator 103 from the received signal and updates the gain of the amplifier 102 every TPC data, specifically, raises or lowers the gain by 1 dB if the extracted TPC data is 1 or 0, respectively.

The mobile terminal unit 110 includes a pilot demodulator 111 for extracting a pilot symbol from received signals, an SIR estimation unit 112 for estimating the signal component S and an interference component I from the pilot symbol extracted by the pilot demodulator 111 to compute the SIR, and a TPC generator 113 for setting 0 or 1 as TPC data for cases where the SIR as computed by the SIR estimation unit 112 is larger or smaller than a threshold value, respectively. The mobile terminal 110 also includes a multiplexing processing unit 114 for time-multiplexing the TPC data generated by the TPC generator 113 with information data to the base station 100, and a modulation unit 115 for code-spreading the information data time-multiplexed with TPC data by this multiplexing processing unit 114 for transmission to the radio propagation path.

In this mobile terminal 110, the pilot demodulator 111 extracts the pilot symbol from the received signals. The pilot symbol demodulated by the pilot demodulator 111 has been affected by interference and multi-path fading germane to radio propagation.

The SIR estimation unit 112 calculates the SIR as it estimates the signal component S and the interference component I from the received pilot symbol pilot[n] as follows:

$$S = \frac{1}{N}\sum_{n=0}^{N-1}(\text{Pilot}[n])(\text{Pilot}[n])*$$

$$I = \sum_{n=0}^{N-1}(\text{Pilot}[n] - S)(\text{Pilot}[n] - S)*$$

$$SIR = S/N$$

where N is the number of pilot symbols.

The TPC generator 113 sets 0 or 1, as TPC data, if the SIR calculated in the SIR estimation unit 112 is larger or smaller than a threshold value. The TPC data is time-multiplexed with the information data to the base station by the multiplexing processing unit 114 and code-spread by the modulation unit 115 so as to be transmitted over antenna 116 to the radio propagation path.

In this manner, the mobile terminal 110 adjusts the transmission power of the base station 100 to a minimum level, capable of assuring the reception quality, as required, with respect to time-varying characteristics of the radio propagation path.

Figure 7:
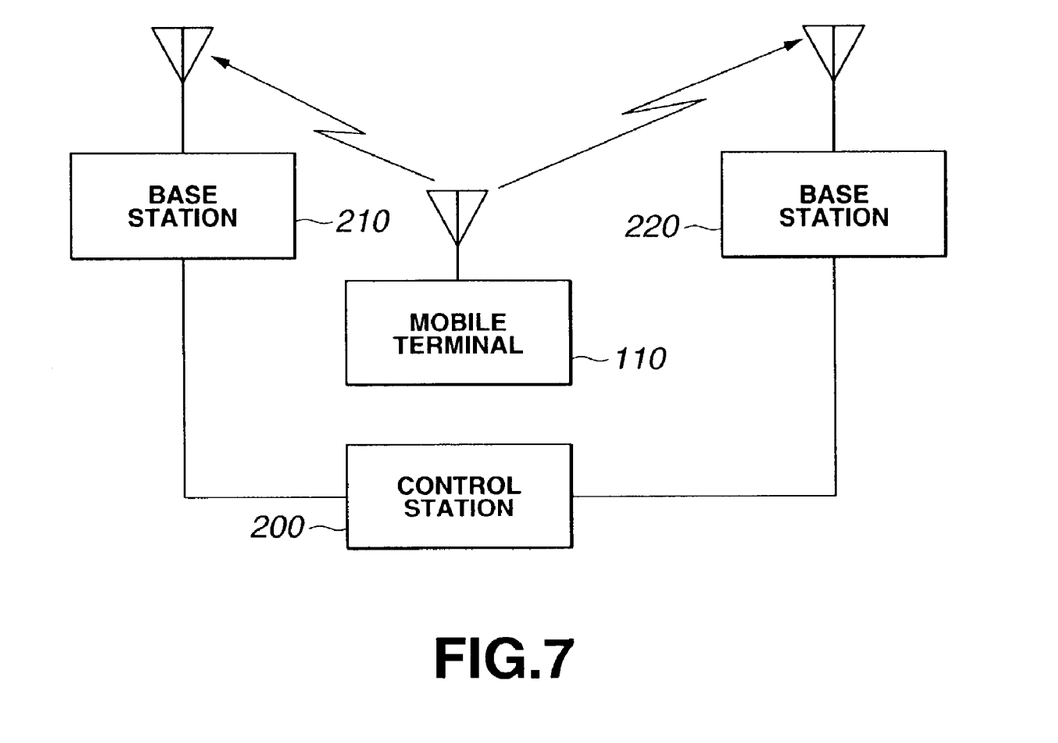
FIG. 7 shows the general concept of site diversity.
Figure 8:
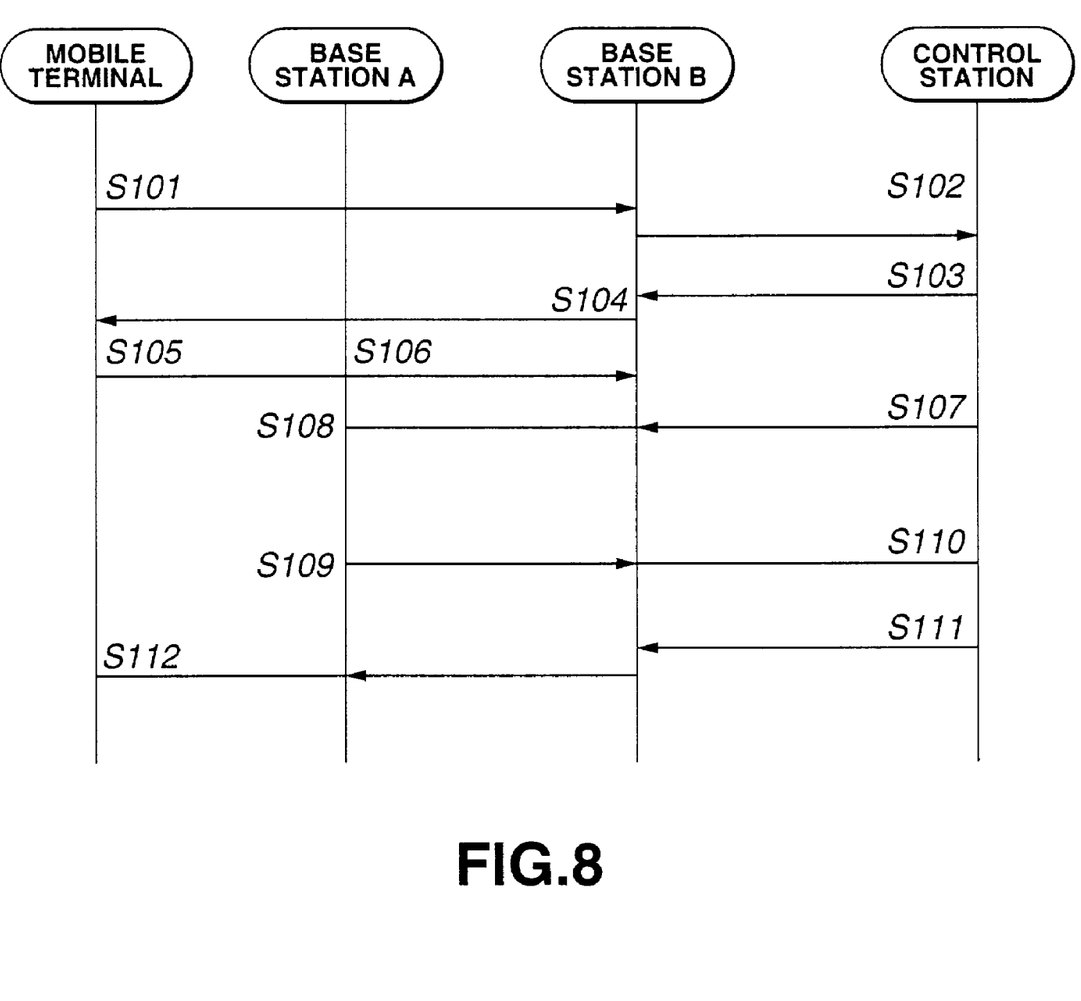
FIG. 8 shows the processing sequence of site diversity in the mobile communication system.

In the above-described mobile transmission system, the mobile terminal 110 simultaneously receives signals from the first base station 210 and the second base station 220, controlled by the control station 200, as shown in the conceptual diagram for site diversity, shown in FIG. 7, and performs site diversity processing in accordance with the sequence shown in FIG. 8. In the following explanation, one of the first and second base stations 210, 220 is termed the base station A, with the other being termed the base station B.

That is, on detecting at step S101 that the timing of the base station A is excessively delayed as compared to that of the base station B, the mobile terminal 110 notifies that effect with a "Unusual Timing Message". In this "unusual timing message", there are included the base station ID of the base station A and the timing difference from the base station B as reference. The base stations A and B demodulate this message to transfer the demodulated message to the control station 200.

The control station 200 at step S102 detects this "Unusual Timing Message" to discriminate the base station ID.

The control station 200 at step S103 transfers an "Active Set Update" message.

In the "Active Set Update" message, there are included the timing information and the ID only of the base station B. The base stations A and B send a message from the base station 200 to the mobile terminal 110.

The mobile terminal 110 at step S104 detects the "Active Set Update message" to recognize that it is only the base station B that is the base station with which the mobile terminal 110 is to communicate, and halts reception from the base station A.

The mobile terminal 110 at step S105 returns "ACK" to the base stations A and B and to the control station 200 for notifying that the Active Set updating has been finished.

On reception of "ACK" at step S106, the base station A halts transmission to the mobile terminal 110.

Using the timing information included in the "Unusual Timing message" as detected at step S102, the control station 200 at step S107 commands the base station A to adjusts the transmission timing to re-start transmission.

The base station A at step S108 sets the transmission timing to a timing as close to the commanded timing as possible, in accordance with a command from the control station 200, to re-start transmission to the mobile terminal A.

Also, the base station A at step S109 reports the actual transmission timing to the control station 200.

The control station at step S110 recognizes the transmission timing of the base station A to transmit at step S111 the "Active Set Update message" to the terminal. In this "Active Set Update message", there are included the IDs of the base stations A, B and the respective timing information.

The mobile terminal 110 at step S112 estimation unit 112 detects that the base station A has been added as a base station for communication and re-starts communication with both the base stations A and B.

In the present first embodiment, described above, the base station, for which the timing shift has been detected, can be deleted and re-connected so that the reception timing from the base stations in site diversity will perpetually be comprised within the allowable range.

A reception device of a second embodiment of the present invention is hereinafter explained.

Figure 9:
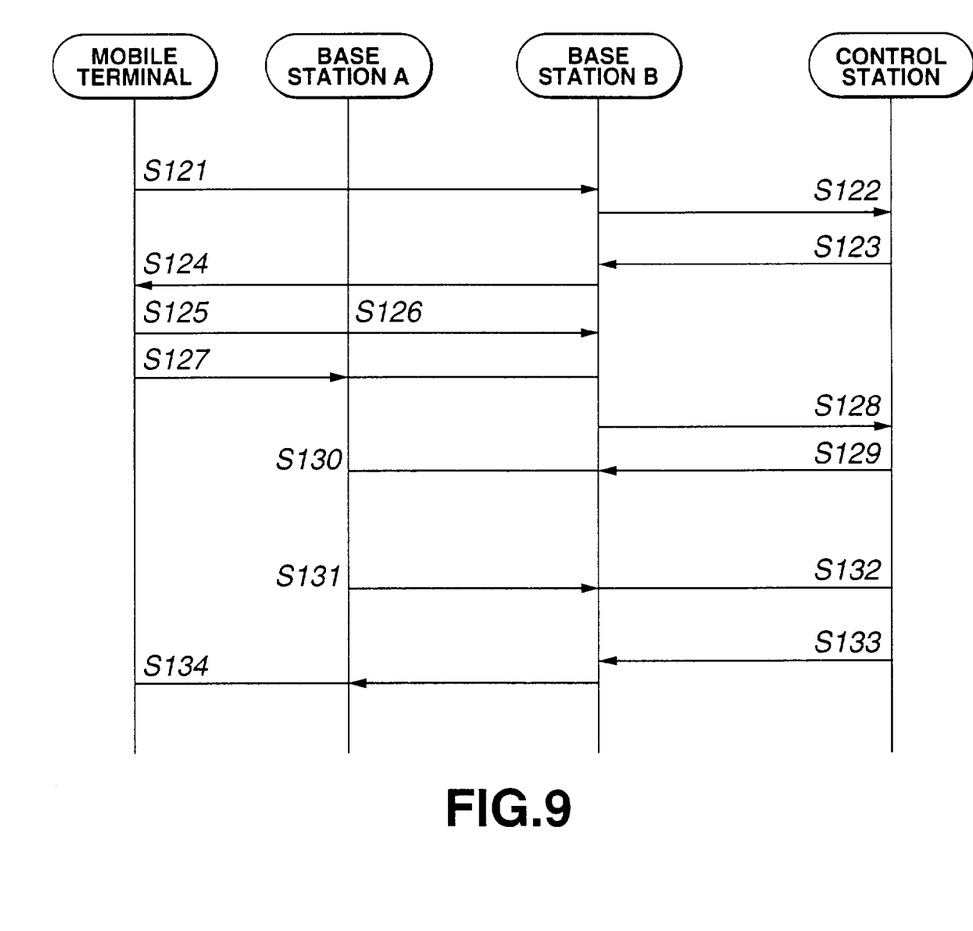
FIG. 9 shows the processing sequence of site diversity in the mobile communication system showing a second embodiment of the present invention.

FIG. 9 shows a processing sequence showing the second embodiment of the present invention.

In this second embodiment, when the mobile terminal 110 detects at step S121 that the timing of the base station A is delayed excessively from that of the base station B, the mobile terminal 110 determines that the base station A cannot be received and transmits a "Measurement Report Message". This "Measurement Report Message", including the base stations IDs, reception signal strength and the timing information of the base stations A and B, sets the reception signal level of the base station A to the lowest level and reports that reception is not possible on the part of the mobile terminal 110. The base stations A, B demodulate this message to transfer the demodulated message to the control station 200.

The control station 200 at step S122 detects the "Measurement Report Message" to recognize that the signal from the base station A has not been recognized by the mobile terminal 110.

The control station at step S123 transfers the "Active Set Update" message. In this "Active Set Update" message, there are included the timing information and the ID of only the base station B. The base stations A, B send the message from the control station 200 to the mobile terminal 110.

The mobile terminal 110 at step S124 detects the "Active Set Update" message to recognize that only the base station B is the base station it is to communicate with to halt reception from the base station A.

The mobile terminal 110 at step S125 returns "ACK" to notify to the base stations A, B and to the control station 200 that updating of Active Set has been finished.

On reception of "ACK" at step S127, the base station A halts transmission to the mobile terminal 110.

The mobile terminal 110 at step S127 transmits the "Measurement Report Message", in which there are included the IDs, reception strength and the timing information of the base stations A, B.

The control station 200 at step S128 detects the "Measurement Report Message", to recognize that newly the signal from the base station A has been recognized.

Using the timing information as detected at step S128, the control station 200 at step S129 commands the base station A to adjust the timing and to commence the transmission.

The base station A at step S130 sets the transmission timing to a timing as close to the commanded timing as possible, in accordance with a command from the control station 200, to re-start the transmission to the mobile terminal 110.

The base station A at step S131 reports the actual transmission timing to the control station 200.

The control station 200 at step S132 recognizes the actual transmission timing of the base station A and transmits at step S133 a "Measurement Report Message" to the terminal. In the "Active Set Update" message, there are included the IDs of the base stations A, B and the respective base stations.

The mobile terminal 110 at step S134 detects that the base station A has been added as the base stations to communicate with and re-starts communication with the base stations A, B.

The mobile terminal 110 at step S134 detects that the base station A has now been added as the base station it is to communicate with and re-starts communication with both the base stations A and B.

Thus, in the present second embodiment, it is possible to delete and re-connect the base station, in which the timing shift has been detected, and to cause the reception timings from the base stations in site diversity to be comprised at all times in the allowable range. The technique described here is realized by solely the "Measurement Report Message" and the "Active Set Update Message". Since these messages are those used in the related art and hence may be implemented without system-side changes.

In the above-described first embodiment, the mobile terminal 110 performs control such that it measures the time difference between the transmission timing and the oncoming signal from each base station and, when the time difference has exceeded the tolerable range, that effect is sent as the "unusual timing message", indicating the information specifying the base station in which the timing difference has exceeded the above allowable range, along with the time difference. Responsive to the unusual timing information, the base station 200 transiently halts the site diversity between the mobile terminal and the base station, for which the time difference has exceeded the allowable range, adjusts the transmission timing of the base station, and re-starts the site diversity between the base station and the mobile terminal at a new transmission timing. It is however possible for the mobile terminal 110 to measure the time difference of the oncoming signal from the base station that is newly in a reception enabled state and to notify the information specifying the base station that is newly in a reception enabled state to the control station along with the time difference to make a request for starling the communication. On receipt of the request from the mobile terminal for starting the communication with the new base station, the control station 200 performs control to start communication with the new base station to adjust the timing of the transmission with the new base station to start the site diversity with the mobile terminal.

Moreover, in the above-described second embodiment, the mobile terminal 110 measures the timing difference of the oncoming signal from the base station that is newly in a reception enabled state to make a communication start request by sending to the control station the information specifying the base station in the reception enabled state along with the time difference. The control station 200 then performs control, on receipt of the request from the mobile terminal for starting the communication with the new base station, to adjust the timing of the transmission with the new base station to start the site diversity thereof with the mobile terminal. It is however possible for the control station 200 to transiently stop the site diversity between the base station where the time difference has exceeded the allowable range and the mobile terminal and to adjust the transmission timing of the base station to re-start site diversity between the base station and the mobile terminal at a new transmission timing.

According to the present invention, described above, if, during reception of plural base stations, the timing differences with the respective base stations have exceeded the tolerable range, the base station(s) which are problematical ss to timing are transiently deleted from the base stations, as the counterpart of communication, and are again added as counterpart of communication after timing adjustment, so that the signal reception timing will be comprised at all times in the allowable range.

Moreover, according to the present invention, optimum transmission power control becomes possible by deleting the base station, which is problematical as to the timing difference. On the other hand, by re-starting connection after timing adjustment, the site diversity may be effectively exploited to improve the reception quality.

In addition, according to the present invention, it is possible to delete the base station, which is problematical as to timing, to adjust the timing and to re-connect the deleted base station, with the use only of the messages used in the processing of the customary site diversity processing, thereby realizing the aforementioned effect by processing only on the side terminal without changing system specifications.

The invention claimed is:

1. A mobile communication system for exploiting site diversity, said system comprising:
   a plurality of base stations, each one of said plurality of base stations being operable to asynchronously transmit signals and to transmit, slot by slot, information data and a pilot signal time-multiplexed with respect to the information data;
   a control station operable to control said plurality of base stations; and
   a mobile terminal operable to concurrently receive the transmitted signals from said plurality of base stations said mobile terminal including:
      unusual timing information transmission means for measuring a time difference between a transmission timing associated with a given one of said plurality of base stations and a specific incoming signal received associated with that base station, said measuring being carried out for each one of said plurality of base stations from which said mobile terminal receives the associated incoming signal, and when the time difference of a particular one of said plurality of base stations has exceeded an allowable range, for sending unusual timing information to said particular one of said plurality of base stations and to said control station, the unusual timing information including information specifying the particular one of said plurality of base stations and the time difference for that base station;
   said control station including:
      controlling means for transiently halting the site diversity between the mobile terminal and said particular one of said plurality of base stations based on the received unusual timing information, and for transmitting setting information, which excludes information concerning said particular one of said plurality of base stations, to said mobile terminal through at least another one of said plurality of base stations;
      said mobile terminal terminating reception from said particular one of said plurality of base stations in response to receiving the setting information and then transmitting an acknowledgement message to said particular one of said plurality of base stations; and
      said particular one of said plurality of base stations terminating transmission to said mobile terminal in response to receiving the acknowledgement message.

2. The mobile communication system according to claim 1, wherein said controlling means of said control station transmits a command to said particular one of said plurality of base stations that adjusts the transmission timing of said particular one of said plurality of base stations to re-start site diversity between said particular one of said plurality of base stations and said mobile terminal at a new transmission timing.

3. The mobile communication system according to claim 1, wherein said mobile terminal subsequently measures the timing difference of incoming signals received from a further base station from which the incoming signals are now receivable, and then transmits to said control station information specifying the further base station along with the measured timing difference to request starting communication with said further base station; and said control station, in response to receiving the request for starting communication, transmits a command for adjusting the transmission timing of said further base station to start site diversity between said further base station and said mobile terminal.

4. A mobile communication system for exploiting site diversity, said system comprising:

a plurality of base stations, each one of said plurality of base stations being operable to asynchronously transmit signals and to transmit, slot by slot, information data and a pilot signal time-multiplexed with respect to the information data;

a control station operable to control said plurality of base stations; and a mobile terminal operable to concurrently receive the transmitted signals from said plurality of base stations said mobile terminal including:

transmission means for measuring a time difference between a transmission timing associated with a given one of said plurality of base stations and a specific incoming signal received associated with that base station, said measuring being carried out for each one of said plurality of base stations from which said mobile terminal receives the associated incoming signal, and when the time difference of a particular one of said plurality of base stations has exceeded an allowable range, for transmitting measurement report information to each one of said plurality of base stations and to said control station, the measurement report information including an associated reception signal level and associated timing information for each one of said plurality of base stations along with the information specifying that base station;

said control station including:

controlling means for transiently halting the site diversity between said mobile terminal and said particular one of said plurality of base stations based on the measurement report information, for sending setting information to said mobile terminal through said plurality of base stations, the setting information excluding information concerning said particular one of said plurality of base stations based on the measurement report information;

said mobile terminal terminating reception from said particular one of said plurality of base stations in response to receiving the setting information and then transmitting an acknowledgement message to said particular one of said plurality of base stations; and said particular one of said plurality of base stations terminating transmission to said mobile terminal in response to receiving the acknowledgement message.

5. The mobile communication system according to claim 4, wherein said mobile terminal subsequently measures the timing difference of incoming signals received from a further base station from which the incoming signals are now receivable, and then transmits to said control station further measurement report information specifying said further base station along with the timing difference to request starting communication with said further base station;

said control station, in response to receiving the request for starting communication, transmits a command for adjusting the transmission timing of said further base station to start site diversity between said further base station and said mobile terminal.

6. The mobile communication system according to claim 4, wherein said controlling means of said control station then transmits a command for adjusting the transmission timing of said particular one of said plurality of base stations to re-start site diversity between said particular one of said plurality of base stations and said mobile terminal at a new transmission timing.

* * * * *